United States Patent
Tanimoto

(10) Patent No.: US 8,554,935 B2
(45) Date of Patent: Oct. 8, 2013

(54) RELAY SERVER AND RELAY COMMUNICATION SYSTEM

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 55 days.

(21) Appl. No.: 13/496,664

(22) PCT Filed: Sep. 17, 2010

(86) PCT No.: PCT/JP2010/005679
§ 371 (c)(1),
(2), (4) Date: Mar. 16, 2012

(87) PCT Pub. No.: WO2011/039966
PCT Pub. Date: Apr. 7, 2011

(65) Prior Publication Data
US 2012/0185603 A1 Jul. 19, 2012

(30) Foreign Application Priority Data

Sep. 30, 2009 (JP) ................................. 2009-227502

(51) Int. Cl.
*G06F 15/16* (2006.01)
(52) U.S. Cl.
USPC ............ 709/229; 709/227; 709/228; 370/401
(58) Field of Classification Search
USPC ........................... 709/227, 228, 229; 370/401
See application file for complete search history.

(56) References Cited

U.S. PATENT DOCUMENTS

| | | | |
|---|---|---|---|
| 6,226,673 B1 * | 5/2001 | Yoshimoto | 709/223 |
| 6,574,656 B1 | 6/2003 | Nagaoka et al. | |
| 6,898,641 B1 | 5/2005 | Kobayashi | |
| 6,950,431 B1 * | 9/2005 | Nozaki et al. | 370/390 |
| 7,804,789 B2 * | 9/2010 | Craig et al. | 370/255 |
| 8,107,498 B2 * | 1/2012 | Morimoto et al. | 370/501 |
| 2003/0140637 A1 | 7/2003 | Masui et al. | |
| 2003/0144872 A1 | 7/2003 | Masui et al. | |
| 2004/0218611 A1 | 11/2004 | Kim | |
| 2008/0137672 A1 | 6/2008 | Tanimoto | |

(Continued)

FOREIGN PATENT DOCUMENTS

| | | |
|---|---|---|
| JP | 09-168055 A | 6/1997 |
| JP | 2000-059465 A | 2/2000 |

(Continued)

OTHER PUBLICATIONS

English translation of Official Communication issued in corresponding International Application PCT/JP2010/005679, mailed on Apr. 12, 2012.

(Continued)

*Primary Examiner* — Kenny Lin
(74) *Attorney, Agent, or Firm* — Keating & Bennett, LLP

(57) ABSTRACT

In a relay server, a routing group information sharing unit shares routing group information, which is prepared by grouping routing control points including at least two of a first relay server in a relay group, a second relay server in the relay group, a client terminal connected to the first relay server, and a client terminal connected to the second relay server. A routing session establishment unit establishes a routing session, which enables a communication packet to be routed via the routing control points, for each group indicated in the routing group information while referring to relay server information.

8 Claims, 16 Drawing Sheets

(56) References Cited

U.S. PATENT DOCUMENTS

| | | |
|---|---|---|
| 2008/0147825 A1 | 6/2008 | Tanimoto |
| 2008/0288591 A1 | 11/2008 | Tanimoto |
| 2008/0298367 A1 | 12/2008 | Furukawa |

FOREIGN PATENT DOCUMENTS

| | | | |
|---|---|---|---|
| JP | 2002-217938 A | 8/2002 | |
| JP | 2002-247036 A | 8/2002 | |
| JP | 2004-213533 A | 7/2004 | |
| JP | 2004-229299 A | 8/2004 | |
| JP | 2005-157699 A | 6/2005 | |
| JP | 2006-202218 A | 8/2006 | |
| JP | 2006-337021 A | 12/2006 | |
| JP | 2007-310508 A | 11/2007 | |
| JP | 2008-028600 A | 2/2008 | |
| JP | 2008-092520 A | 4/2008 | |
| JP | 2008-129991 A | 6/2008 | |
| JP | 2008-306500 A | 12/2008 | |
| JP | 2010-178089 A | 8/2010 | |
| JP | 2010-256989 A | 11/2010 | |
| JP | 2010-267084 A | 11/2010 | |
| JP | 2010-278636 A | 12/2010 | |
| JP | 2011-055452 A | 3/2011 | |
| JP | 2011-055453 A | 3/2011 | |
| JP | 2011-055454 A | 3/2011 | |
| JP | 2011-160103 A | 8/2011 | |

OTHER PUBLICATIONS

Official Communication issued in corresponding European Patent Application No. 10820092.4, mailed on Jul. 19, 2012.
Tanimoto, "Relay Server and Relay Communication System Arranged to Share Resources Between Networks,", U.S. Appl. No. 13/153,497, filed Jun. 6, 2011.
Official Communication issued in International Patent Application No. PCT/JP2010/005679, mailed on Oct. 26, 2010.
Tanimoto, "Relay-Server Arranged to Carry Out Communications Between Communication Terminals on Different LANs,", U.S. Appl. No. 11/853,943, filed Sep. 12, 2007.
Tanimoto, "File Server Device Arranged in a Local Area Network and Being Communicable With an External Service Arranged in a Wide Area Network,", U.S. Appl. No. 11/862,654, filed Sep. 27, 2007.
Tanimoto, "File Transfer Server,", U.S. Appl. No. 11/870,622, filed Oct. 11, 2007.
Tanimoto, "Relay Server and Client Terminal,", U.S. Appl. No. 11/953,351, filed Dec. 10, 2007.
Tanimoto, "Relay Server, Relay Communication System, and Communication Device,", U.S. Appl. No. 11/944,495, filed Nov. 23, 2007.
Tanimoto, "Relay Server and Relay Communication System Arranged to Share Resources Between Networks,", U.S. Appl. No. 11/953,505, filed Dec. 10, 2007.
Tanimoto, "Relay Server and Relay Communication System,", U.S. Appl. No. 12/103,933, filed Apr. 16, 2008.
Tanimoto, "Relay Server and Relay Communication System,", U.S. Appl. No. 12/112,127, filed Apr. 30, 2008.
Tanimoto, "Relay Server and Relay Communication System,", U.S. Appl. No. 12/107,793, filed Apr. 23, 2008.
Tanimoto, "Relay Server and Relay Communication System,", U.S. Appl. No. 12/270,883, filed Nov. 14, 2008.
Tanimoto, "Relay Server Adn Relay Communication System,", U.S. Appl. No. 12/335,642, filed Dec. 16, 2008.
Tanimoto, "Relay Server and Relay Communication System,", U.S. Appl. No. 12/335,661, filed Dec. 16, 2008.
Tanimoto, "Relay Server and Relay Communication System,", U.S. Appl. No. 12/340,868, filed Dec. 22, 2008.
Tanimoto, "Relay Server and Relay Communication System,", U.S. Appl. No. 13/061,234, filed Feb. 28, 2011.
Tanimoto, "Relay Server, Relay Communication System, and Communication Apparatus,", U.S. Appl. No. 13/061,725, filed Mar. 2, 2011.
Tanimoto, "Relay Server, Communication System and Facsimile System," U.S. Appl. No. 10/045,698, filed Jan. 10, 2002.
Tanimoto, "Relay Server, Communication System and Facsimile System," U.S. Appl. No. 10/045,897, filed Jan. 10, 2002.
Tanimoto, "Relay Server for Relaying Communications Between Network Devices," U.S. Appl. No. 10/114,720, filed Apr. 1, 2002.
Tanimoto, "Relay Server," U.S. Appl. No. 10/114,963, filed Apr. 2, 2002.
Tanimoto, "Relay Server, Network Device, Communication System, and Communication Method," U.S. Appl. No. 10/116,615, filed Apr. 2, 2002.
Tanimoto, "Relay Device and Communication System," U.S. Appl. No. 11/723,466, filed Mar. 20, 2007.
Tanimoto, "Relay Device and Communication System," U.S. Appl. No. 13/341,711, filed Dec. 30, 2011.
Tanimoto, "First Relay Server and Second Relay Server,", U.S. Appl. No. 13/255,958, filed Oct. 3, 2011.
Tanimoto, "Relay Communication System and First Relay Server,", U.S. Appl. No. 13/320,034, filed Nov. 11, 2011.
Tanimoto et al., "Relay Comunication System and Access Management Apparatus,", U.S. Appl. No. 13/390,561, filed Feb. 15, 2012.
Inai et al., "A Scalable Log Collecting Scheme for Host-Based Traffic Monitoring System," Information Processing Society of Japan Symposium Series, vol. 2008, No. 1, Jul. 2, 2008, 27 pages.

* cited by examiner

FIG.3

| group1 | relayserverA | relayserverB | relayserverC |

```
<?xml version="1.0" encoding="UFT-8" standalone="no" ?>
- <root>
  - <group id="20070402133100@serverA.relay.net"         ⎱ ─── 201
      lastmod="20070402133100" name="group1">            ⎰
      <site id="serverA@relay.net" rel="allow" />  ⎫
      <site id="serverB@relay.net" rel="allow" />  ⎬ ─── 202
      <site id="serverC@relay.net" rel="allow" />  ⎭
    </group>
</root>
```

| | |
|---|---|
| relayserverA | clientA1 |
| | clientA2 |
| relayserverB | clientB1 |
| relayserverC | clientC1 |
| | clientC2 |

FIG.6

```
<?xml version="1.0" encoding="UFT-8" ?>
- <root>
  - <site id="serverA@relay.net" name="serverA" stat="active"> }      301-1
      <node div="dev" group="20070402133100@serverA.relay.net"
        id="clientA1@serverA.relay.net" name="clientA1"
        site="serverA@relay.net" />
      <node div="dev" group="20070402133100@serverA.relay.net"      302-1
        id="clientA2@serverA.relay.net" name="clientA2"
        site="serverA@relay.net" />
    </site>
  - <site id="serverB@relay.net" name="serverB" stat="active"> }     301-2
      <node div="dev" group="20070402133100@serverA.relay.net"
        id="clientB1@serverB.relay.net" name="clientB1"              302-2
        site="serverB@relay.net" />
    </site>
  - <site id="serverC@relay.net" name="serverC" stat="active"> }     301-3
      <node div="dev" group="20070402133100@serverA.relay.net"
        id="clientC1@serverC.relay.net" name="clientC1"
        site="serverC@relay.net" />
      <node div="dev" group="20070402133100@serverA.relay.net"       302-3
        id="clientC2@serverC.relay.net" name="clientC2"
        site="serverC@relay.net" />
    </site>
</root>
```

```
<?xml version="1.0" encoding="UFT-8" ?>
- <root>
    <node addr="192.168.2.1" div="dev" expr="1213935978484"
      group="20070402133100@serverA.relay.net"
      id="clientA2@serverA.relay.net" name="clientA2" pass="abc"
      port="50700" />
    <node addr="192.168.1.30" div="dev" expr="1213935978484"
      group="20070402133100@serverA.relay.net"
      id="clientA1@serverA.relay.net" name="clientA1" pass="def" port="0" />
</root>
```

```
<?xml version="1.0" encoding="UFT-8" ?>
- <root>
    <node addr="192.100.1.3" div="dev" expr="1213935978484"
      group="20070402133100@serverA.relay.net"
      id="clientB1@serverB.relay.net" name="clientB1" pass="abc"
      port="50700" />
  </root>
```

```
<?xml version="1.0" encoding="UFT-8" ?>
- <root>
    <node addr="200.1.2.1" div="dev" expr="1213935978484"
      group="20070402133100@serverA.relay.net"
      id="clientC1@serverC.relay.net" name="clientC1" pass="abc"
      port="50700" />.
    <node addr="200.1.3.100" div="dev" expr="1213935978484"
      group="20070402133100@serverA.relay.net"
      id="clientC2@serverC.relay.net" name="clientC2" pass ="def" port="0" />
  </root>
```

| | | |
|---|---|---|
| 70-1 | relayserverA | 192.168.1.10 |
| | | 192.168.1.20 |
| | | 192.168.1.30 |
| 70-2 | clientA2 | 192.168.2.1 |
| | | 192.168.2.2 |
| | | 192.168.2.3 |
| 70-3 | clientB1 | 192.100.1.2 |
| 70-4 | clientC1 | 200.1.2.1 |
| | | 200.1.2.2 |
| 70-5 | clientC2 | 200.1.3.0/24 |

FIG.11

```
<?xml version="1.0" encoding="UFT-8" ?>
- <root>
   - <router id="serverA@relay.net">
       <dev addr="192.168.1.10" id="serverA.relay.net" />
       <dev addr="192.168.1.20" />
       <dev addr="192.168.1.30" id="clientA1@serverA.relay.net" />
     </router>                                                          70-1
   - <router id="clientA2@serverA.relay.net">
       <dev addr="192.168.2.1" id="clientA2@serverA.relay.net" />
       <dev addr="192.168.2.2" />
       <dev addr="192.168.2.3" />
     </router>                                                          70-2
   - <router id="clientB1@serverB.relay.net">
       <dev addr="192.100.1.2" id="clientB1@serverB.relay.net" />
     </router>                                                          70-3
   - <router id="clientC1@serverC.relay.net">
       <dev addr="200.1.2.1" id="clientC1@serverC.relay.net" />
       <dev addr="200.1.2.2" />
     </router>                                                          70-4
   - <router id="clientC2@serverC.relay.net">
       <dev addr="200.1.3.0/24" />
       <dev addr="200.1.3.100" id="clientC2@serverC.relay.net" />
     </router>                                                          70-5
</root>
```

```
<?xml version="1.0" encoding="UFT-8" ?>
- <root>
  - <rtgroup id="20070702203100@serverA.relay.net"          ──── 801-1
      lastmod="20070702203100" name="rtgroupA">
    - <router id="serverA@relay.net">
        <dev addr="192.168.1.10" id="serverA@relay.net" />
        <dev addr="192.168.1.20" />                          ──── 802-1
        <dev addr="192.168.1.30" id="clientA1@serverA.relay.net" />
      </router>
    - <router id="clientC2@serverC.relay.net">
        <dev addr="200.1.3.0/24" />                          ──── 802-2
        <dev addr="200.1.3.100" id="clientC2@serverC.relay.net" />
      </router>
    </rtgroup>
  - <rtgroup id="20070802203100@clientA2.serverA.relay.net"  ──── 801-2
      lastmod="20070802203100" name="rtgroupB">
    - <router id="clientA2@serverA.relay.net">
        <dev addr="192.168.2.1" id="clientA2@serverA.relay.net" />
        <dev addr="192.168.2.2" />                           ──── 802-3
        <dev addr="192.168.2.3" />
      </router>
    - <router id="clientB1@serverB.relay.net">
        <dev addr="192.100.1.2" id="clientB1@serverB.relay.net" />  ──── 802-4
      </router>
    - <router id="clientC1@serverC.relay.net">
        <dev addr="200.1.2.1" id="clientC1@serverC.relay.net" />    ──── 802-5
        <dev addr="200.1.2.2" />
      </router>
    </rtgroup>
  </root>
```

FIG.15

```
<?xml version="1.0" encoding="UFT-8" ?>
- <root>
  - <site id="serverA@relay.net" name="serverA" stat="active"> }
      <node div="dev" group="20070402133100@serverA.relay.net"
        id="clientA1@serverA.relay.net" name="clientA1"
        site="serverA@relay.net" />
      <node div="dev" group="20070402133100@serverA.relay.net"
        id="clientA2@serverA.relay.net" name="clientA2"
        site="serverA@relay.net" />
    </site>
  </root>
```

```
<?xml version="1.0" encoding="UFT-8" ?>
- <root>
  - <site id="serverB@relay.net" name="serverB" stat="active"> }
      <node div="dev" group="20070402133100@serverA.relay.net"
        id="clientB1@serverB.relay.net" name="clientB1"
        site="serverB@relay.net" />
      <node div="dev" group="20070402133100@serverA.relay.net"
        id="clientB2@serverB.relay.net" name="clientB2"
        site="serverB@relay.net" />
    </site>
  </root>
```

```
<?xml version="1.0" encoding="UFT-8" ?>
- <root>
  - <site id="serverC@relay.net" name="serverC" stat="active"> }
      <node div="dev" group="20070402133100@serverA.relay.net"
        id="clientC1@serverC.relay.net" name="clientC1"
        site="serverC@relay.net" />
      <node div="dev" group="20070402133100@serverA.relay.net"
        id="clientC2@serverC.relay.net" name="clientC2"
        site="serverC@relay.net" />
    </site>
  </root>
```

```
<?xml version="1.0" encoding="UFT-8" ?>
- <root>
  - <router id="serverA@relay.net">
      <dev addr="192.168.1.10" id="serverA.relay.net" />
      <dev addr="192.168.1.20" />
      <dev addr="192.168.1.30" id="clientA1@serverA.relay.net" />
    </router>
  </root>
```

```
<?xml version="1.0" encoding="UFT-8" ?>
- <root>
  - <router id="clientA2@serverA.relay.net">
      <dev addr="192.168.2.1" id="clientA2@serverA.relay.net" />
      <dev addr="192.168.2.2" />
      <dev addr="192.168.2.3" />
    </router>
  </root>
```

```
<?xml version="1.0" encoding="UFT-8" ?>
- <root>
  - <router id="clientB1@serverB.relay.net">
      <dev addr="192.100.1.2" id="clientB1@serverB.relay.net" />
    </router>
  </root>
```

```
<?xml version="1.0" encoding="UFT-8" ?>
- <root>
  - <router id="clientC1@serverC.relay.net">
      <dev addr="200.1.2.1" id="clientC1@serverC.relay.net" />
      <dev addr="200.1.2.2" />
    </router>
  </root>
```

```
<?xml version="1.0" encoding="UFT-8" ?>
- <root>
  - <router id="clientC2@serverC.relay.net">
      <dev addr="200.1.3.0/24" />
      <dev addr="200.1.3.100" id="clientC2@serverC.relay.net" />
    </router>
  </root>
```

RELAY SERVER AND RELAY COMMUNICATION SYSTEM

BACKGROUND OF THE INVENTION

1. Field of the Invention

The present invention relates to a relay communication system including a plurality of relay servers capable of communicating with one another, a plurality of client terminals, and LANs to connect the client terminals to the relay servers, and further, relates to the relay servers for use in the relay communication system.

2. Description of the Related Art

In some case, client terminals connected to remote LANs communicate with one another beyond a WAN. A virtual private network (VPN) can construct a network that appears as if the remote LANs were directly connected to one another. However, it is difficult for the VPN to construct a network having expandability and flexibility.

A relay communication system disclosed in Japanese Patent Laid-Open Publication No. 2008-129991, like the VPN, can construct a network that appears as if remote LANs were directly connected to one another. In addition, unlike the VPN, it is easy for the relay communication system to construct a network having expandability and flexibility.

In the relay communication system disclosed in Japanese Patent Laid-Open Publication No. 2008-129991, identification information of the client terminals connected to the respective LANs is shared, whereby the communication among the client terminals is enabled. Specifically, association information between identification information of the relay servers and the identification information of the client terminals is shared in the entire network, thereby enabling the relay servers to relay communication packets among the client terminals.

SUMMARY OF THE INVENTION

Preferred embodiments of the present invention dynamically create a virtual network when constructing a relay communication system including a plurality of relay servers capable of communicating with one another.

A relay server according to a preferred embodiment of the present invention is capable of communicating with a first relay server connected to a first network, and functions as a second relay server connected to a second network. The relay server includes a relay group information sharing unit; a relay server information sharing unit; a routing information creation unit; a routing information sharing unit; a routing session establishment unit; a routing control unit; and an inter-relay server connection processing unit. The relay group information sharing unit shares relay group information, which indicates that the first relay server and the second relay server constitute a relay group, between the first relay server and the second relay server. The relay server information sharing unit shares, between the first relay server and the second relay server, relay server information including activation information of the first relay server, activation information of the second relay server, activation/registration information of a client terminal connected to the first relay server, and activation/registration information of a client terminal connected to the second relay server. The routing information sharing unit shares, between the first relay server and the second relay server, routing information including routing control points and network addresses controlled by the routing control points, the routing control points including at least two of the first relay server in the relay group, the second relay server in the relay group, the client terminal connected to the first relay server, and the client terminal connected to the second relay server. The routing group information creation unit edits the routing information, thereby creating routing group information formed by grouping the routing control points. The routing group information sharing unit shares the routing group information among the first relay server, the second relay server, the client terminal connected to the first relay server, and the client terminal connected to the second relay server. The routing session establishment unit establishes a routing session, which enables a communication packet to be routed via the routing control points, for each group indicated in the routing group information while referring to the relay server information. The routing control unit outputs, when receiving a communication packet which is a routing packet, outputs the communication packet if a destination network address included in the received communication packet has been registered in the routing group information. The inter-relay server connection processing unit receives the outputted communication packet and determines a connection through which the communication packet is to be relayed based on a destination network address included in the communication packet such that the communication packet can be forwarded through the established routing session.

Note that the terminals are devices present in the LANs, and are not limited to any specific type. Hence, the terminals may be any of the relay servers, the client terminals, other communication instruments, and networks. Moreover, the routing control points are devices present in the LANs, and just need to be devices having a routing control function. Hence, the routing control points may be either of the relay servers and the client terminals.

In the relay communication system, the first relay server and the second relay server share the relay group information, the relay server information, the routing information, and the routing group information. Moreover, the plurality of relay servers establish the routing sessions for each group of the routing group information.

At the time when the routing sessions are established, the relay servers refer to the relay server information, and can thereby determine which terminal in the routing group is capable of making communication. Hence, the establishment of the routing sessions is realized without waste.

Each of the relay servers may further include a routing function control unit that validates/invalidates a routing function for each group indicated in the routing group information. In this case, the validation/invalidation of the routing function is actually switched by the routing function control unit.

The relay server may further include a display device that displays the routing information. In this case, the user creates the routing group information while looking at the routing information, and can thereby set routes of a plurality of the routing sessions. That is to say, it is easy to set the routes of the routing sessions.

The relay server may further include a routing information update unit that updates the routing information. In this case, it is possible to share the latest routing information in real time among the respective terminals.

A relay communication system according to another preferred embodiment of the present invention includes a first network; a second network; a first relay server connected to the first network; and a second relay server connected to the second network. Each of the first relay server and the second relay server includes a relay server information sharing unit; a routing information sharing unit; a routing group information sharing unit; a routing session establishment unit; a routing control unit; and an inter-relay server connection processing unit. The relay server information sharing unit shares, between the first relay server and the second relay server, relay server information including activation information of the first relay server, activation information of the second relay server, activation/registration information of a client terminal connected to the first relay server, and activation/registration information of a client terminal connected to the second relay server. The routing information sharing unit shares, between the first relay server and the second relay server, routing information including routing control points and network addresses controlled by the routing control points, the routing control points including at least two of the first relay server and the second relay server, the client terminal connected to the first relay server, and the client terminal connected to the second relay server. The routing group information sharing unit shares routing group information, which is formed by grouping the routing control points, among the first relay server, the second relay server, the client terminal connected to the first relay server, and the client terminal connected to the second relay server. The routing session establishment unit establishes a routing session, which enables a communication packet to be routed via the routing control points, for each group indicated in the routing group information while referring to the relay server information. The routing control unit outputs, when receiving a communication packet which is a routing packet, the communication packet if a destination network address included in the received communication packet has been registered in the routing group information. The inter-relay server connection processing unit receives the outputted communication packet and determines a connection through which the communication packet is to be relayed based on a destination network address included in the communication packet such that the communication packet can be forwarded through the established routing session.

With the relay server and the relay communication system according to various preferred embodiments of the present invention, the virtual network can be dynamically created when constructing the relay communication system including the plurality of relay servers capable of communicating with one another.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a view showing a schematic configuration of relay group information.

FIG. 4 is a view showing a detailed configuration of the relay group information.

FIG. 5 is a view showing a schematic configuration of relay server information.

FIG. 6 is a view showing a detailed configuration of the relay server information.

FIG. 7 is a view showing a detailed configuration of client terminal information stored in the first relay server.

FIG. 8 is a view showing a detailed configuration of client terminal information stored in a second relay server.

FIG. 9 is a view showing a detailed configuration of client terminal information stored in a third relay server.

FIG. 10 is a view showing a schematic configuration of routing information.

FIG. 11 is a view showing a detailed configuration of the routing information.

FIG. 13 is a view showing a detailed configuration of the routing group information.

FIG. 15 is a view showing a detailed configuration of relay server information before exchange.

FIG. 16 is a view showing a detailed configuration of relay server information before exchange.

FIG. 17 is a view showing a detailed configuration of relay server information before exchange.

FIG. 19 is a view showing a detailed configuration of routing information stored in the first relay server.

FIG. 20 is a view showing a detailed configuration of routing information stored in a second client terminal.

FIG. 21 is a view showing a detailed configuration of routing information stored in a third client terminal.

FIG. 22 is a view showing a detailed configuration of routing information stored in a fifth client terminal.

FIG. 23 is a view showing a detailed configuration of routing information stored in a sixth client terminal.

DETAILED DESCRIPTION OF THE PREFERRED EMBODIMENTS

First Preferred Embodiment

Figure 1:
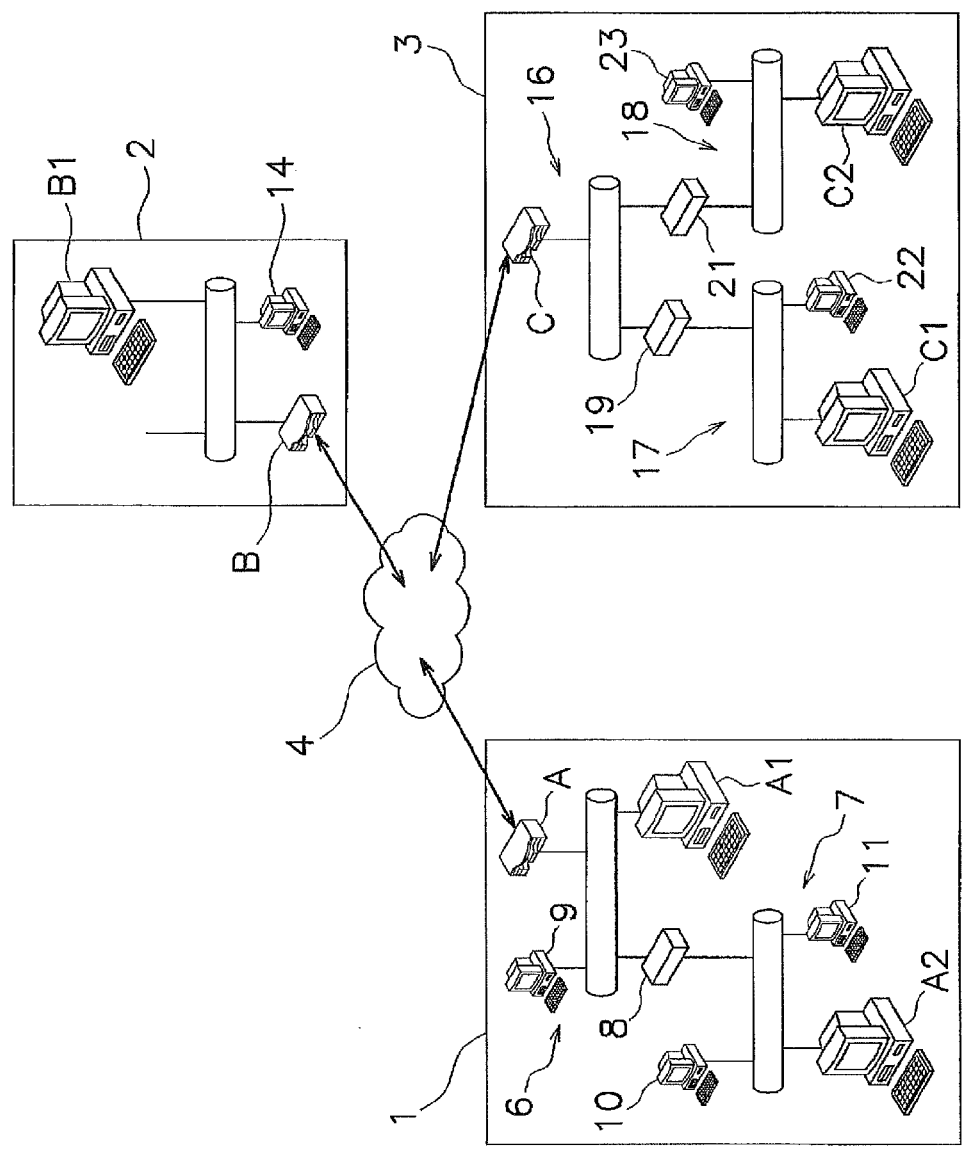
FIG. 1 is a schematic view showing an overall configuration of a relay communication system.

A description will be provided below of preferred embodiments of the present invention while referring to the drawings. FIG. 1 shows an overall configuration of a relay communication system. The relay communication system preferably includes a first LAN 1, a second LAN 2, a third LAN 3, and a WAN 4. The first LAN 1, the second LAN 2 and the third LAN 3 preferably are small-scale networks constructed remotely from one another. The WAN 4 preferably is a large-scale network such as the Internet.

As will be described later in detail, a first relay server A of the first LAN 1, a second relay server B of the second LAN 2, and a third relay server C of the third LAN 3 define a first relay server group.

The first LAN 1 includes a fourth LAN 6 and a fifth LAN 7, which are connected to each other by a first general-purpose router 8. In the fourth LAN 6, the first relay server A, a first client terminal A1 and a first communication instrument 9 are connected to one another. In the fifth LAN 7, a second client terminal A2, a second communication instrument 10 and a third communication instrument 11 are connected to one another.

In the second LAN 2, the second relay server B, a third client terminal B1 and a fourth communication instrument 14 are connected to one another.

The third LAN 3 includes a sixth LAN 16, a seventh LAN 17 and an eighth LAN 18, the sixth LAN 16 and the seventh LAN 17 are connected to each other by a second general-purpose router 19, and the sixth LAN 16 and the eighth LAN 18 are connected to each other by a third general-purpose router 21. The third relay server C belongs to the sixth LAN 16. In the seventh LAN 17, a fourth client terminal C1 and a fifth communication instrument 22 are connected to each other. In the eighth LAN 18, a fifth client terminal C2 and a sixth communication instrument 23 are connected to each other.

The first client terminal A1, the second client terminal A2, the third client terminal B1, the fourth client terminal C1 and the fifth client terminal C2 are, for example, personal computers. The first communication instrument 9, the second communication instrument 10, the third communication instrument 11, the fourth communication instrument 14, the fifth communication instrument 22 and the sixth communication instrument 23 are also, for example, personal computers.

The first relay server A, the second relay server B and the third relay server C relay communication among the first client terminal A1, the second client terminal A2, the third client terminal B1, the fourth client terminal C1 and the fifth client terminal C2. The WAN 4 relays communication among the first relay server A, the second relay server B and the third relay server C.

Note that the communication protocol used among the first relay server A, the second relay server B and the third relay server C is not particularly limited.

Figure 2:
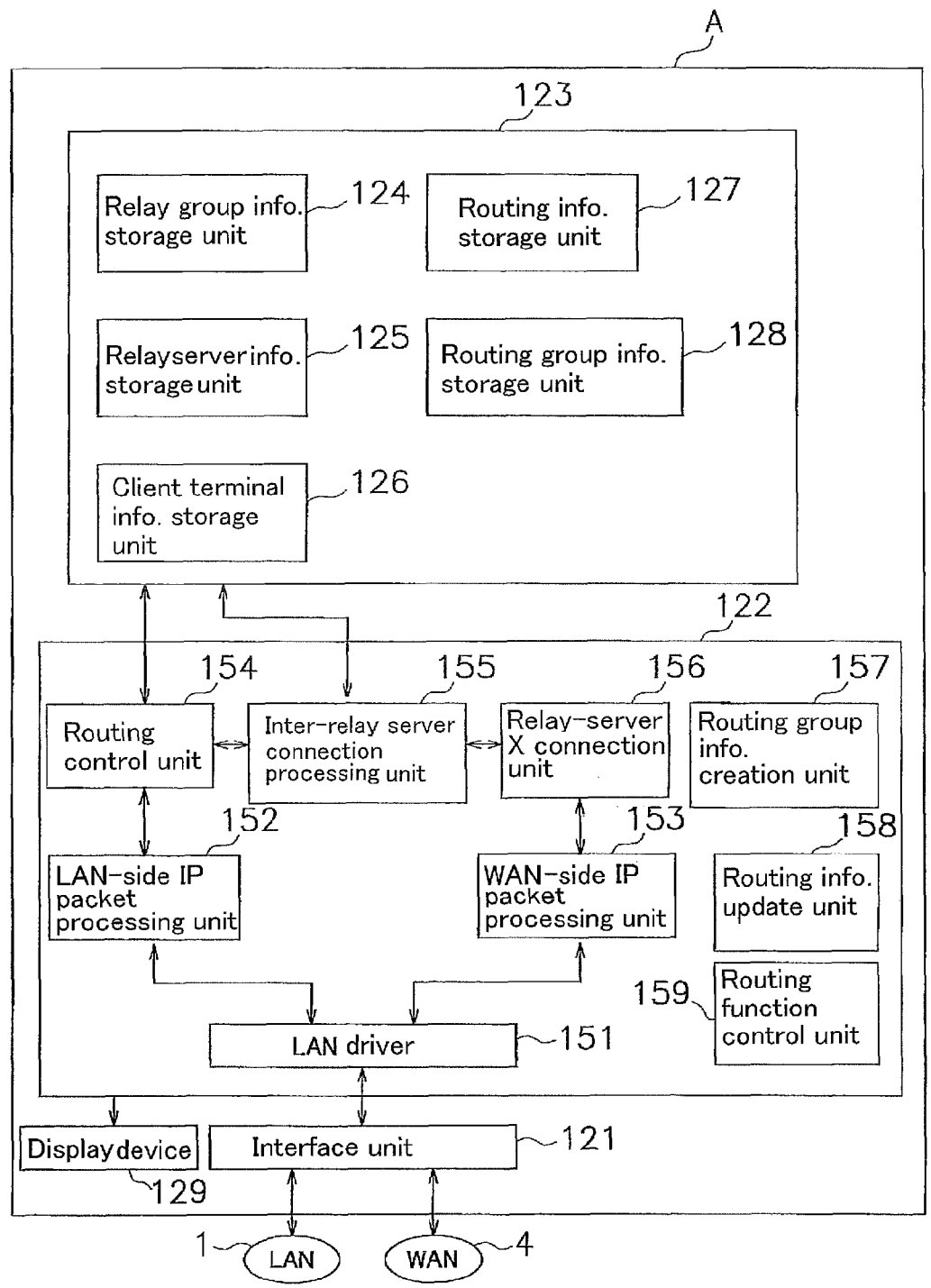
FIG. 2 is a block diagram showing a configuration of a first relay server.

The relay servers are connected not only to the LANs but also to the WAN. The relay servers are capable of communicating with the respective client terminals connected to the same LANs, and are capable of communicating with the relay servers arranged in the other LANs. Therefore, in addition to a private IP address, a global IP address is assigned to each of the relay servers. FIG. 2 shows constituent elements of the first relay server A. The first relay server A includes an interface 121, a control unit 122, and a database storage unit 123. Moreover, the first relay server A may include, as hardware, a display device 129 such as a display.

By using the private IP address, the interface 121 performs communication with the terminals in the first LAN 1. The interface 121 performs communication with the WAN 4 by using the global IP address.

The control unit 122 is, for example, a CPU having functions to perform control and arithmetic operations, and is capable of executing a variety of processing based on programs loaded thereon. The control unit 122 is a processing unit that controls various communications performed through a LAN interface 121A and a WAN interface 121B, and the control unit 122 controls a variety of communication processing that follows protocols such as TCP/IP, UDP, and SIP, for example. The control unit 122 includes a LAN driver 151, a LAN-side IP packet processing unit 152, a WAN-side IP packet processing unit 153, a routing control unit 154, an inter-relay server connection processing unit 155, and a relay server X connection unit 156.

The LAN driver 151 includes driver software that controls the interface 121. The LAN-side IP packet processing unit 152 processes communication packets received from the LAN side, and outputs the communication packets to the routing control unit 154. The routing control unit 154 determines a routing destination for the communication packets based on information stored in the database storage unit 123. Based on information stored in the database storage unit 123, the inter-relay server connection processing unit 155 determines a connection to which the communication packets are to be relayed, and outputs the communication packets to the relay server X connection unit 156. The relay server X connection unit 156 indicates a connection actually constructed with a specific relay server X. The relay server X connection unit 156 outputs the communication packets to the WAN-side IP packet processing unit 153. Moreover, the control unit 122 creates or updates the following information stored in the database storage unit 123. In order to create or update the information stored in the database storage unit 123, the control unit 122 further includes, for example, a routing group information creation unit 157 and a routing information update unit 158. The routing group information creation unit 157 creates routing group information, which will be described later. The routing information update unit 158 updates routing information, which will be described later.

The control unit 122 further includes a routing function control unit 159 having a routing control function to validate/invalidate a routing function for each group indicated in the routing group information.

The database storage unit 123 is, for example, a hard disk or a nonvolatile RAM, and is capable of storing a variety of data. The database storage unit 123 includes a relay group information storage unit 124, a relay server information storage unit 125, a client terminal information storage unit 126, a routing information storage unit 127, and a routing group information storage unit 128.

Note that, since constituent elements of the second relay server B and the third relay server C are similar to those of the first relay server A, a description thereof is omitted.

Each of the client terminals is a terminal directly operable by a user. The client terminal is, for example, a personal computer to be used by the user for daily business operations. To each of the client terminals, a private IP address is assigned, which is uniquely managed in a same LAN. Constituent elements of the client terminal include a LAN interface, a control unit and a database storage unit (not shown in figures), in a similar way to the relay server.

FIG. 3 shows a schematic configuration of relay group information 20. The relay group information 20 is information indicating an outline of each relay group in the relay communication system. FIG. 3 shows that a first relay group preferably includes the first relay server A, the second relay server B and the third relay server C.

FIG. 4 shows a detailed configuration of the relay group information 20. The relay group information 20 preferably includes upper information 201 and lower information 202.

The upper information 201 is information of the first relay group itself. "group id" indicates identification information of the relay group. "lastmod" indicates a latest update time of the relay group information. "name" indicates a name of the relay group.

The lower information 202 is information regarding the first relay server A, the second relay server B and the third relay server C. "site id" indicates identification information of the relay servers.

The relay group information 20 is stored in the relay group information storage unit 124 of each relay server. That is to say, the relay group information 20 is shared among the first relay server A, the second relay server B and the third relay server C. Moreover, the relay group information 20 is also shared between each relay server and each client terminal.

FIG. 5 shows a schematic configuration of relay server information 30. The relay server information 30 is information indicating an outline of the relay servers and the client terminals, which compose the relay communication system.

As shown in FIG. 5, the first client terminal A1 and the second client terminal A2 are connected to the first relay server A. The third client terminal B1 is connected to the second relay server B. The fourth client terminal C1 and the fifth client terminal C2 are connected to the third relay server C.

FIG. 6 shows a detailed configuration of the relay server information 30. The relay server information 30 preferably includes upper information 301-1, 301-2 and 301-3, and lower information 302-1, 302-2 and 302-3.

Each piece of the upper information 301-1, 301-2 and 301-3 is information regarding the relay server. "site id" indicates identification information of the relay server. "name" indicates a name of the relay server. "stat" indicates information as to whether or not the relay server is activated.

Each piece of the lower information 302-1, 302-2 and 302-3 is information regarding the client terminal. "div" indicates a division name of the client terminal. "group" indicates identification information of the relay group to which the client terminal belongs. "name" indicates a name of the client terminal. "site" indicates identification information of the relay server as a log-on destination in the case where the client terminal is logged on.

The relay server information 30 is stored in the relay server information storage unit 125. That is to say, the relay server information 30 is shared among the first relay server A, the second relay server B and the third relay server C. Moreover, the relay server information 30 is shared between each relay server and each client terminal.

When each relay server is activated, "stat" in each piece of the upper information 301-1, 301-2 and 301-3 is "active". When a relay server is not activated, "stat" is blank. In such a way, the information as to whether or not a relay server is activated is shared in the entire relay communication system.

When each client terminal is logged onto a relay server, the identification information of the relay server as the log-on destination of the client terminal is recorded in "site" of each piece of the lower information 302-1, 302-2 and 302-3. When a client terminal is not logged onto the relay server, "site" is blank. In such a way, the information as to whether or not a client terminal is logged onto the relay server is shared in the entire relay communication system.

FIG. 7, FIG. 8 and FIG. 9 show client terminal information 40, 50 and 60, respectively, as specific examples of client terminal information. The client terminal information 40, 50 and 60 are information indicating details of the client terminals which are included in the relay communication system.

"addr" is address information of a client terminal, and specifically, indicates an IP address of the client terminal. "div" indicates a division name of the client terminal. "expr" is expiration period information of the client terminal, and specifically, indicates a registration expiration period of the client terminal. "group" indicates identification information of a relay group to which the client terminal belongs. "id" indicates identification information of the client terminal. "name" indicates a name of the client terminal. "pass" indicates a password of the client terminal. "port" is port information of the client terminal, and specifically, indicates a port number of the client terminal.

The client terminal information 40 is stored in the client terminal information storage unit 126 of the first relay server A. The client terminal information 50 is stored in the client terminal information storage unit 126 of the second relay server B. The client terminal information 60 is stored in the client terminal information storage unit 126 of the third relay server C.

The routing information preferably includes IP addresses of terminals controlled by terminals which function as routing control points in the relay groups. The first relay server A, the second client terminal A2, the third client terminal B1, the fourth client terminal C1 and the fifth client terminal C2 function as the routing control points in the first relay group. The routing information is formed by synthesizing information held by the routing control points regarding the IP addresses of the terminals that serve as control targets.

FIG. 10 shows a schematic configuration of routing information 70. The routing information 70 is divided into routing information 70-1, routing information 70-2, routing information 70-3, routing information 70-4 and routing information 70-5.

The routing information 70-1 is information held in the first relay server A, and includes: an IP address (192.168.1.10) of the first relay server A; an IP address (192.168.1.20) of the first communication instrument 9; and an IP address (192.168.1.30) of the first client terminal A1.

The routing information 70-2 is information held in the second client terminal A2, and includes: an IP address (192.168.2.1) of the second client terminal A2; an IP address (192.168.2.2) of the second communication instrument 10; and an IP address (192.168.2.3) of the third communication instrument 11.

The routing information 70-3 is information held in the third client terminal B1, and includes an IP address (192.100.1.2) of the fourth communication instrument 14.

The routing information 70-4 is information held in the fourth client terminal C1, and includes: an IP address (200.1.2.1) of the fourth client terminal C1; and an IP address (200.1.2.2) of the fifth communication instrument 22.

The routing information 70-5 is information held in the fifth client terminal C2, and includes an IP address (200.1.3.0/24) of the eighth LAN 18.

FIG. 11 shows a detailed configuration of the routing information 70. "router id" indicates identification information of each routing control terminal. "dev addr" indicates the IP address of each terminal. "id" indicates identification information of each terminal in the first relay group.

The routing group information is information constructed by dividing the IP addresses in the routing information into a plurality of groups.

A description is now provided of the creation of the routing group information. The routing group information is associated with the relay group information, and when a user selects the relay group at a terminal, the routing information corresponding thereto is displayed on the display. While looking at the routing information on the display of the relay server, the client terminal or the communication instrument, the user divides the IP addresses in the routing information into a plurality of groups, thereby creating the routing group information. Specifically, in accordance with an instruction from the user, the control unit of the relay server creates the routing group information, and stores the created routing group information in the routing group information storage unit.

Figure 12:
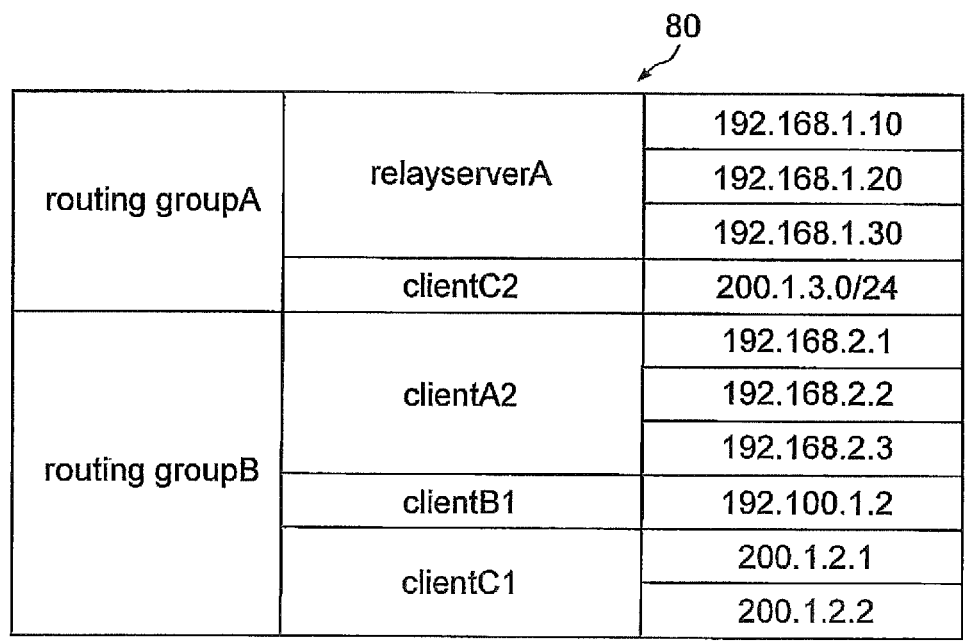
FIG. 12 is a view showing a schematic configuration of routing group information.

FIG. 12 shows a schematic configuration of routing group information 80. The routing group information 80 is divided into a routing group A and a routing group B. The first relay server A and the fifth client terminal C2 belong to the routing group A. The second client terminal A2, the third client terminal B1 and the fourth client terminal C1 belong to the routing group B.

FIG. 13 shows a detailed configuration of the routing group information 80. The routing group information 80 includes: upper information 801-1 and 801-2; and lower information 802-1, 802-2, 802-3, 802-4 and 802-5.

The upper information is information regarding the routing group. In each of the upper information 801-1 and 801-2, "rtgroup id" indicates identification information of the routing group. "lastmod" indicates a latest update time of the routing group information. "name" indicates a name of the routing group.

The lower information is information regarding the routing control point. In each of the lower information 802-1, 802-2, 802-3, 802-4 and 802-5, "router id" indicates identification information of the routing control terminal. "devaddr" indicates an IP address of the terminal. "id" indicates identification information of the terminal in the relay group.

Figure 14:
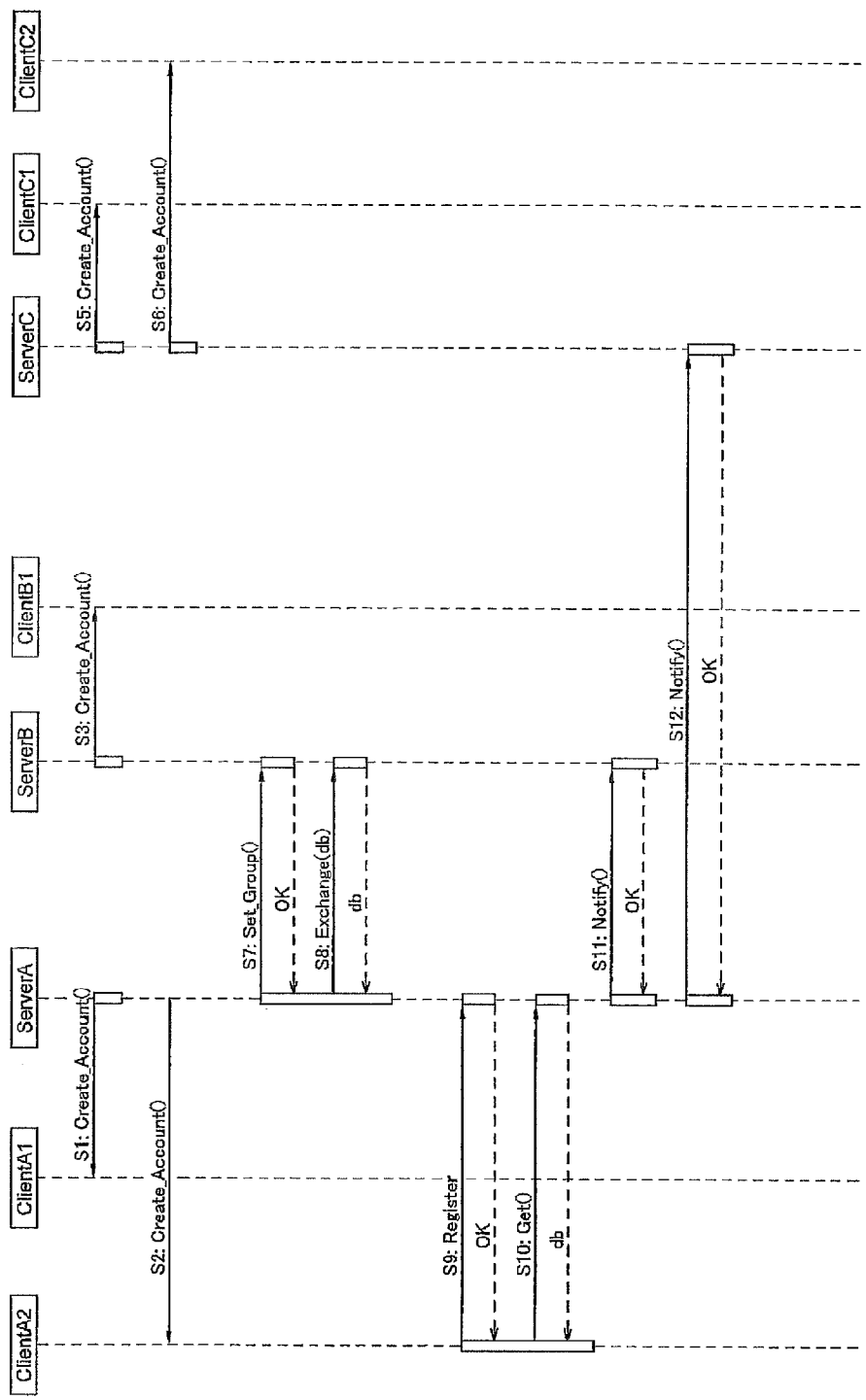
FIG. 14 is a chart showing a flow of process regarding construction of a relay group.

By using the sequence chart of FIG. 14, a description is provided of an initial setting of the first relay group. Specifically, FIG. 14 shows a flow of process regarding creation of the relay group information, the relay server information and the client terminal information.

An administrator of the first relay server A creates accounts for users of the first client terminal A1 and the second client terminal A2 (Step S1, Step S2: Create_Account( )). An administrator of the second relay server B creates an account for a user of the third client terminal B1 (Step S3: Create_Account( )). An administrator of the third relay server C creates accounts for users of the fourth client terminal C1 and the fifth client terminal C2 (Step S5, Step S6: Create_Account( )).

In the above-described process, the first relay server A creates and stores relay server information (described later). The second relay server B creates and stores relay server information (described later). The third relay server C creates and stores relay server information (described later). Moreover, the first relay server A creates and stores client terminal information, the second relay server B creates and stores client terminal information, and the third relay server C creates and stores client terminal information.

FIG. 15, FIG. 16 and FIG. 17 show relay server information 31-1, relay server information 31-2 and relay server information 31-3. The relay server information 31-1 is the information created and stored by the first relay server A. The relay server information 31-2 is the information created and stored by the second relay server B. The relay server information 31-3 is the information created and stored by the third relay server C.

FIG. 15 shows the relay server information 31-1. Upper information 311-1 is information about the first relay server A. As "site id", "serverA@relay.net" is set. As "name", "serverA" is set. As "stat", "active" is set.

Lower information 312-1 is information about the first client terminal A1 and the second client terminal A2.

The information about the first client terminal A1 is as follows. As "div", "dev" is set. As "group", "20070402133100@serverA.relay.net" is set. As "id", "clientA1@ServerA.relay.net" is set. As "name", "clientA1" is set. Note that, in FIG. 15, "serverA@relay.net" is set as "site", which indicates that the user of the first client terminal A1 is logged onto the first relay server A; however, in reality, the "site" is blank at a stage of Steps S1 to S6 of FIG. 14.

The information about the second client terminal A2 is as follows. As "div", "dev" is set. As "group", "20070402133100@serverA.relay.net" is set. As "id", "clientA2@ServerA.relay.net" is set. As "name", "clientA2" is set. Note that the description for "site" is similar to that in the case of the first client terminal A1.

Contents of the relay server information 31-2 and the relay server information 31-3 are similar to the content of the relay server information 31-1, and accordingly, a description thereof is omitted.

In FIG. 14, the first relay server A requests the second relay server B to construct a group of the relay communication system (Step S7: Set_Group ( )). The first relay server A and the second relay server B create and store the relay group information. Next, the first relay server A requests the second relay server B to exchange the relay server information (Step S8: Exchange ( )). In such a way, the first relay server A transmits the relay server information to the second relay server B, and the second relay server B transmits the relay server information to the first relay server A. The first relay server A and the second relay server B synthesize these relay server information to make a new relay server information, and store the new relay server information. Note that, though not shown in the figure, process similar to those of Step S7 and Step S8 is also executed between the first relay server A and the third relay server C, and further, is also executed between the second relay server B and the third relay server C. As a result, a common relay server information is owned by the first relay server A, the second relay server B and the third relay server C.

The user of the second client terminal A2 inputs the identification information and password of the second client terminal A2, and logs on to the first relay server A (Step S9: Register). The first relay server A refers to the client terminal information, and performs user authentication for the second client terminal A2. The first relay server A updates the client terminal information.

Subsequently, the second client terminal A2 requests the first relay server A to provide the relay group information and the relay server information (Step S10: get( )). The first relay server A transmits the relay group information and the relay server information to the second client terminal A2. The second client terminal A2 stores the relay group information and the relay server information.

The first relay server A refers to the relay server information. When confirming that "site" regarding the second relay server B is "active", the first relay server A determines that the second relay server B should be notified that the relay server information has been updated. The first relay server A notifies the second relay server B that the relay server information has been updated (Step S11: Notify ( )). The second relay server B updates and stores the relay server information. Note that the first relay server A also notifies the third relay server C that the relay server information has been updated (Step S12: Notify ( )).

When the users of the first client terminal A1, the third client terminal B1, the fourth client terminal C1 and the fifth client terminal C2 log on to the respective relay servers, those relay server information in the relay servers are updated in a similar way. Moreover, when the users of the respective client terminals log off, the relay server information in the relay servers are also updated in a similar way.

A description will now be provided of a sharing process when the information of the relay group is changed.

Figure 18:
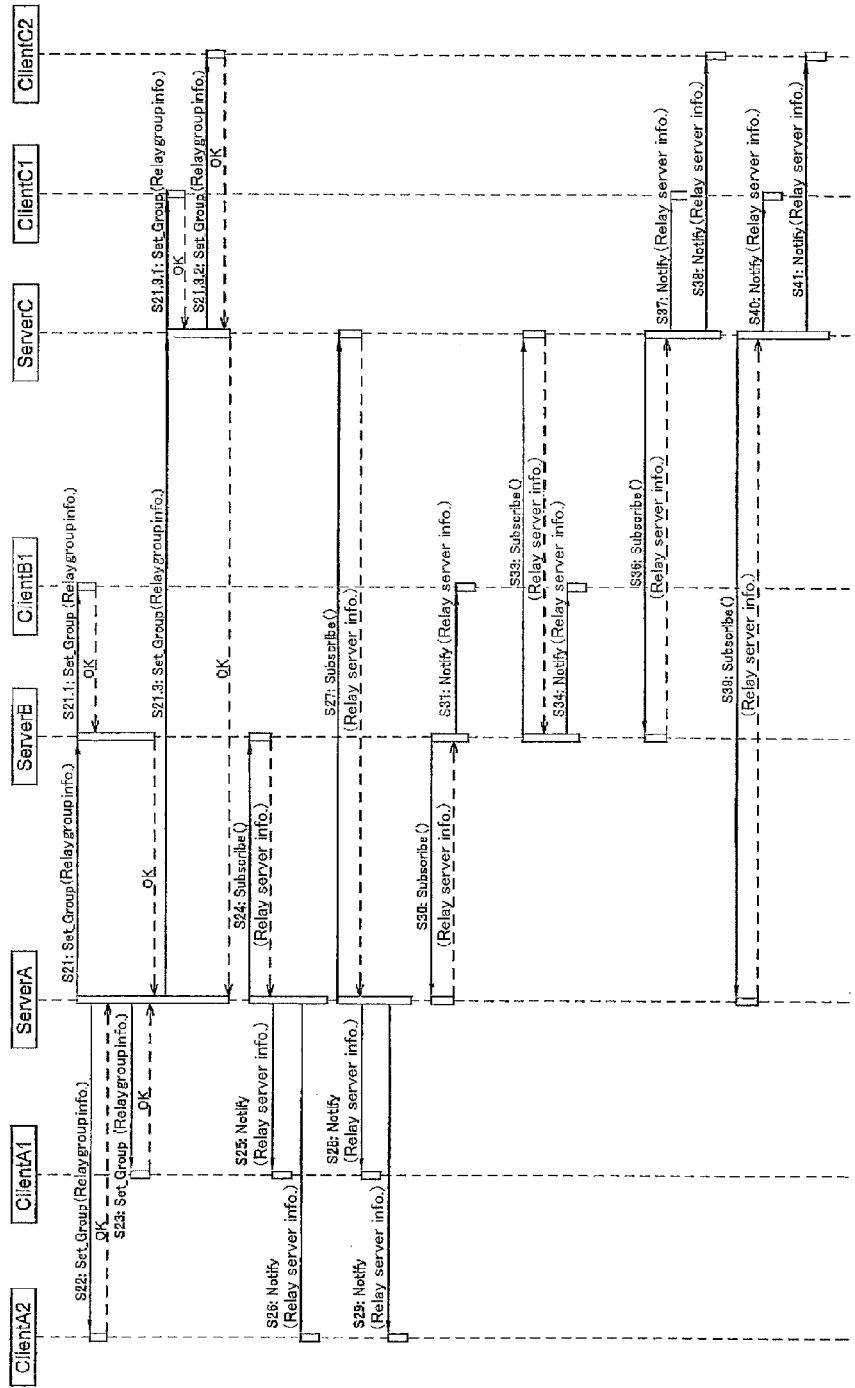
FIG. 18 is a chart showing a flow of process regarding sharing of the relay group information and the relay server information.

In FIG. 18, when a change occurs in the first relay group, for example, the first relay server A transmits such changed relay group information to the second relay server B (Step S21: Set_Group (relay group information)). Then, the second relay server B transmits the relay group information to the third client terminal B1 (Step S21.1: Set_Group (relay group information)). When OK is returned from the third client terminal B1, the second relay server B returns OK to the first relay server A.

Moreover, the first relay server A transmits the changed relay group information to the second client terminal A2 (Step S22: Set_Group (relay group information)). The second client terminal A2 returns OK to the first relay server A. The first relay server A transmits the changed relay group information 20 to the first client terminal A1 (Step S23: Set_Group (relay group information)). The first client terminal A1 returns OK to the first relay server A.

The first relay server A transmits the relay group information 20 of the relay communication system to the third relay server C (Step S21.3: Set_Group (relay group information)). Then, the third relay server C transmits the relay group information 20 to the fourth client terminal C1 and the fifth client terminal C2 (Step S21.3.1 and Step S21.3.2: Set_Group (relay group information)). When OK is returned from each of the fourth client terminal C1 and the fifth client terminal C2, the third relay server C returns OK to the first relay server A.

Through the above-described process, all of the relay servers and the client terminals share a same relay group information.

A description is now provided of the sharing of the relay server information. Here, the process for the sharing uses a framework of event notification. In the event notification, a subscriber is an agent who requests status notification of a resource, and a reporter is an agent who issues a notice on the status of the resource. When a change occurs in the status of the resource during a subscription period, the subscriber is notified of the change by the reporter.

The first relay server A applies for subscription of the relay server information to the second relay server B (Step S24: Subscribe ( )). When a change occurs in the condition represented by the relay server information, the second relay server B updates the relay server information held thereby. Then, the second relay server B transmits the updated relay server information to the first relay server A. The first relay server A updates the relay server information using the relay server information transmitted from the second relay server B. The first relay server A notifies the first client terminal A1 that the relay server information has been updated (Step S25: Notify (relay server information)), and further notifies the second client terminal A2 of this matter (Step S26: Notify (relay server information)).

Next, the first relay server A applies for subscription of the relay server information to the third relay server C (Step S27: Subscribe ( )). When a change occurs in the condition represented by the relay server information, the third relay server C updates the relay server information held thereby. Then, the third relay server C transmits the updated relay server information to the first relay server A. The first relay server A updates the relay server information using the relay server information transmitted from the third relay server C. The first relay server A notifies the first client terminal A1 that the relay server information has been updated (Step S28: Notify (relay server information)), and further notifies the second client terminal A2 of this matter (Step S29: Notify (relay server information)).

The second relay server B applies for subscription of the relay server information to the first relay server A (Step S30: Subscribe ( )). When a change occurs in the condition represented by the relay server information, the first relay server A updates the relay server information held thereby. Then, the first relay server A transmits the updated relay server information to the second relay server B. The second relay server B updates the relay server information using the relay server information transmitted from the first relay server A. The second relay server B notifies the third client terminal B1 that the relay server information has been updated (Step S31: Notify (relay server information)).

The second relay server B applies for subscription of the relay server information to the third relay server C (Step S33: Subscribe ( )). When a change occurs in the condition represented by the relay server information, the third relay server C updates the relay server information held thereby. Then, the third relay server C transmits the updated relay server information to the second relay server B. The second relay server B updates the relay server information using the relay server information transmitted from the third relay server C. The second relay server B notifies the third client terminal B1 that the relay server information has been updated (Step S34: Notify (relay server information)).

The third relay server C applies for subscription of the relay server information to the second relay server B (Step S36: Subscribe ( )). When a change occurs in the condition represented by the relay server information, the second relay server B updates the relay server information held thereby. Then, the second relay server B transmits the updated relay server information to the third relay server C. The third relay server C updates the relay server information using the relay server information transmitted from the second relay server B. The third relay server C notifies the fourth client terminal C1 that the relay server information has been updated (Step S37: Notify (relay server information)), and further notifies the fifth client terminal C2 of this matter (Step S38: Notify (relay server information)).

The third relay server C applies for subscription of the relay server information to the first relay server A (Step S39: Subscribe ( )). When a change occurs in the condition represented by the relay server information, the first relay server A updates the relay server information held thereby. Then, the first relay server A transmits the updated relay server information to the third relay server C. The third relay server C updates the relay server information using the relay server information transmitted from the first relay server A. The third relay server C notifies the fourth client terminal C1 that the relay server information has been updated (Step S40: Notify (relay server information)), and further notifies the fifth client terminal C2 of this matter (Step S41: Notify (relay server information)).

Through the above-described process, the first relay server A, the second relay server B and the third relay server C also share the updated relay server information immediately when the relay server information is updated. Hence, the first relay server A, the second relay server B and the third relay server C can always grasp activation statuses of the other relay servers and types and log-on statuses of the client terminals connected to the relay servers concerned.

In the case where an increase/decrease in the number or a connection status of the LANs or the client terminals is changed in the relay communication system, at the time of recognizing such a change, one of the relay servers immediately updates the relay group information, the relay server information and the client terminal information in response to the change.

Then, the one relay server immediately issues a notice that the relay group information and the relay server information have been updated to the other relay servers listed in the relay group information and the relay server information. Moreover, the one relay server immediately issues a notice that the relay group information and the relay server information have been updated to the client terminals listed in the client terminal information.

However, even if the other relay servers are listed in the relay group information and the relay server information, the one relay server does not immediately issue the above-described notice to the other relay servers when determining that the other relay servers are in an unconnected state. Moreover, even if the client terminals are listed in the client terminal information, the one relay server does not immediately issue the above-described notice to the client terminals when determining that the client terminals are in an unconnected state.

In such a way, the information regarding the increase/decrease in the number or connection status of the LANs or the client terminals is shared in real time in the entire relay communication system.

Next, a description will be provided of the creation of the routing information. When the second client terminal A2 logs on to the first relay server A in Step S9 of FIG. 14, the second client terminal A2 transmits a routing information it holds to the first relay server A. As a result, the first relay server A stores the routing information of the second client terminal A2. In a similar way, when the third client terminal B1 logs on to the second relay server B, the third client terminal B1 transmits a routing information it holds to the second relay server B. As a result, the second relay server B stores the routing information of the third client terminal B1. In a similar way, when the fourth client terminal C1 logs on to the third relay server C, the fourth client terminal C1 transmits a routing information it holds to the third relay server C. As a result, the third relay server C stores the routing information of the fourth client terminal C1. In a similar way, when the fifth client terminal C2 logs on to the third relay server C, the fifth client terminal C2 transmits a routing information it holds to the third relay server C. As a result, the third relay server C stores the routing information of the fifth client terminal C2.

FIG. 19 shows a detailed configuration of routing information 71-1. The routing information 71-1 is the routing information held by the first relay server A, which serves as a routing control point.

FIG. 20 shows a detailed configuration of routing information 71-2. The routing information 71-2 is the routing information held by the second client terminal A2, which serves as a routing control point.

FIG. 21 shows a detailed configuration of routing information 71-3. The routing information 71-3 is the routing information held by the third client terminal B1, which serves as a routing control point.

FIG. 22 shows a detailed configuration of routing information 71-4. The routing information 71-4 is the routing information held by the fourth client terminal C1, which serves as a routing control point.

FIG. 23 shows a detailed configuration of routing information 71-5. The routing information 71-5 is the routing information held by the fifth client terminal C2, which serves as a routing control point.

Based on the above, if all of the client terminals are logged on, then the following operations are performed. The routing information 71-1 and the routing information 71-2 are stored in the first relay server A, the routing information 71-3 is stored in the second relay server B, and the routing information 71-4 and the routing information 71-5 are stored in the third relay server C.

Figure 24:
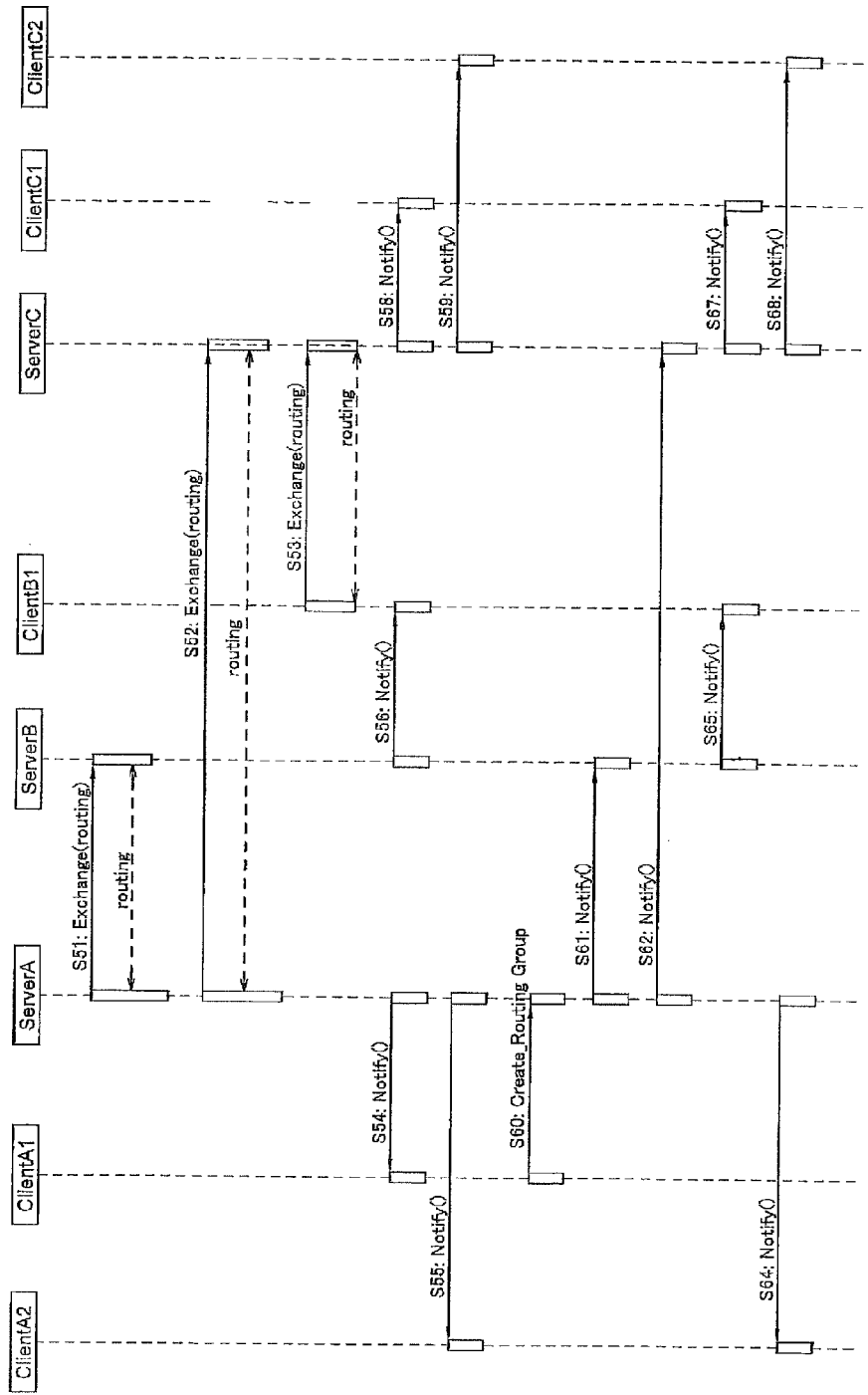
FIG. 24 is a chart showing process regarding sharing of the routing information and the routing group information.

With reference to FIG. 24, a description will be provided of the process for creating/sharing the routing information. First, the first relay server A requests the second relay server B to exchange the routing information (Step S51: Exchange (routing)). In such way, the first relay server A transmits the routing information to the second relay server B, and the second relay server B transmits the routing information to the first relay server A. The first relay server A and the second relay server B synthesize those routing information, and store the resulting routing information as a new routing information. The first relay server A requests the third relay server C to exchange the routing information (Step S52: Exchange (routing)). In such way, the first relay server A transmits the routing information to the third relay server C, and the third relay server C transmits the routing information to the first relay server A. The first relay server A and the third relay server C synthesize those routing information, and store the resulting routing information as new routing information. The second relay server B requests the third relay server C to exchange the routing information (Step S53: Exchange (routing)). In such way, the second relay server B transmits the routing information to the third relay server C, and the third relay server C transmits the routing information to the second relay server B. The second relay server B and the third relay server C synthesize those routing information, and store the resulting routing information as new routing information.

Through the above-described process, the first relay server A, the second relay server B and the third relay server C own a common routing information (for example, the routing information 70 in FIG. 11). Note that the relay servers can detect duplication of IP addresses based on the routing information.

Moreover, the first relay server A notifies the first client terminal A1 of the routing information (Step S54: Notify ( )), and further notifies the second client terminal A2 of the routing information (Step S55: Notify ( )). The second relay server B notifies the third client terminal B1 of the routing information (Step S56: Notify ( )). The third relay server C notifies the fourth client terminal C1 of the routing information (Step S58: Notify ( )), and further notifies the fifth client terminal C2 of the routing information (Step S59: Notify ( )).

As a result of the above, all of the client terminals in the first relay group own the common routing information.

A description will now be provided of creation/sharing of the routing group information. It is possible to display the common routing information (for example, the routing information 70 in FIG. 10) on the display of a client terminal. Accordingly, the user can create the routing group information while looking at the routing information.

The user of the first client terminal A1 creates the routing group information (for example, the routing group information 80 in FIG. 13), and stores the routing group information in the first relay server A (Step S60: Create_RoutingGroup). Specifically, the control unit 122 of the first relay server A creates the routing group information in accordance with an instruction from the user. Next, the first relay server A transmits the routing group information to the second relay server B (Step S61: Notify ( )), and further transmits the routing group information to the third relay server C (Step S62: Notify). The first relay server A notifies the second client terminal A2 of the routing group information (Step S64: Notify ( ). The second relay server B notifies the third client terminal B1 of the routing group information (Step S65: Notify ( )). The third relay server C notifies the fourth client terminal C1 of the routing group information (Step S67: Notify ( )), and further notifies the fifth client terminal C2 of the routing group information (Step S68: Notify ( )).

As a result of the above, all of the relay servers and the client terminals in the first relay group own the common routing group information.

As a result of this, preparation of a routing session performed among the terminals in the routing group is realized. That is to say, the terminals in the group are capable of performing communication in which the IP addresses are directly designated. Note that the address owned by the fifth client terminal C2, which serves as the routing control point, is a network address of the eighth LAN 18. Hence, in this case, communication packets from all of the terminals connected to the eighth LAN 18 can be communicated using the routing session.

Moreover, the user creates the routing group information while looking at the routing information, and can thereby set routes for a plurality of routing sessions. That is to say, it is easy to set the routes for the routing sessions.

When the routing sessions are established, the relay servers refer to the relay server information, and can thereby determine whether or not the terminals in the routing group are capable of performing communication with one another. Hence, no useless routing sessions would be established.

Figure 25:
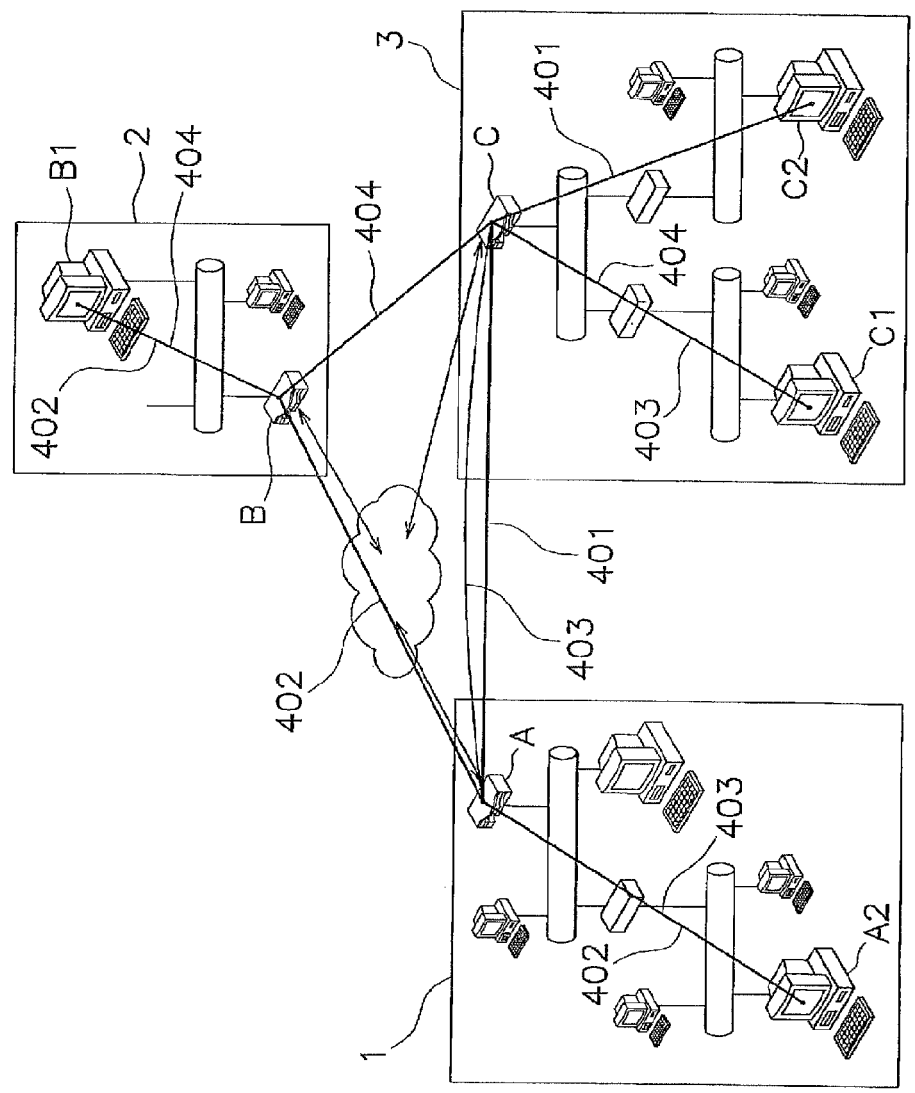
FIG. 25 is a view showing an example of established routing sessions.

FIG. 25 shows an example of the routing sessions.

In the routing group A, it is possible to establish a first routing session 401 between the first relay server A and the fifth client terminal C2. In this case, the communication packet is transferred through the first relay server A, the third relay server C and the fifth client terminal C2.

In the routing group B, a plurality of routing sessions can be established among the second client terminal A2, the third client terminal B1 and the fourth client terminal C1. In this case, in a second routing session 402, the communication packet is transferred through a route of the second client terminal A2, the first relay server A, the second relay server B and the third client terminal B1. In a third routing session 403, the communication packet is transferred through a route of the second client terminal A2, the first relay server A, the third relay server C and the fourth client terminal C1. In a fourth routing session 404, the communication packet is transferred through a route of the fourth client terminal C1, the third relay server C, the second relay server B and the third client terminal B1.

In a connection start instruction to establish the routing session, information regarding the selected routing group is included. Hence, in the selected routing group, the routing session is automatically established among the relay servers selected as router terminals and the client terminals. In other words, a routing network is constructed. In such a manner as described above, the relay servers have the routing control function to validate/invalidate the routing function for each group indicated in the routing group information.

In order to actually start the routing function after the routing session has been established, for example, it is necessary to wait until all of the terminals serving as the routing control points in the group are activated. Alternatively, it has to be waited until some of the terminals serving as the routing control points in the group are activated. In either of the cases, activation statuses of the terminals can be confirmed through the relay server information.

Moreover, when a disconnection instruction is inputted, the routing session is disconnected, and as a result, routing network function is stopped.

When the routing is started, routing control for an IP packet is performed based on the communication function of the relay communication system using the established routing session. In this way, the routing validated in this preferred embodiment is executed in the application layer, and differs from the usual IP routing.

Figure 26:
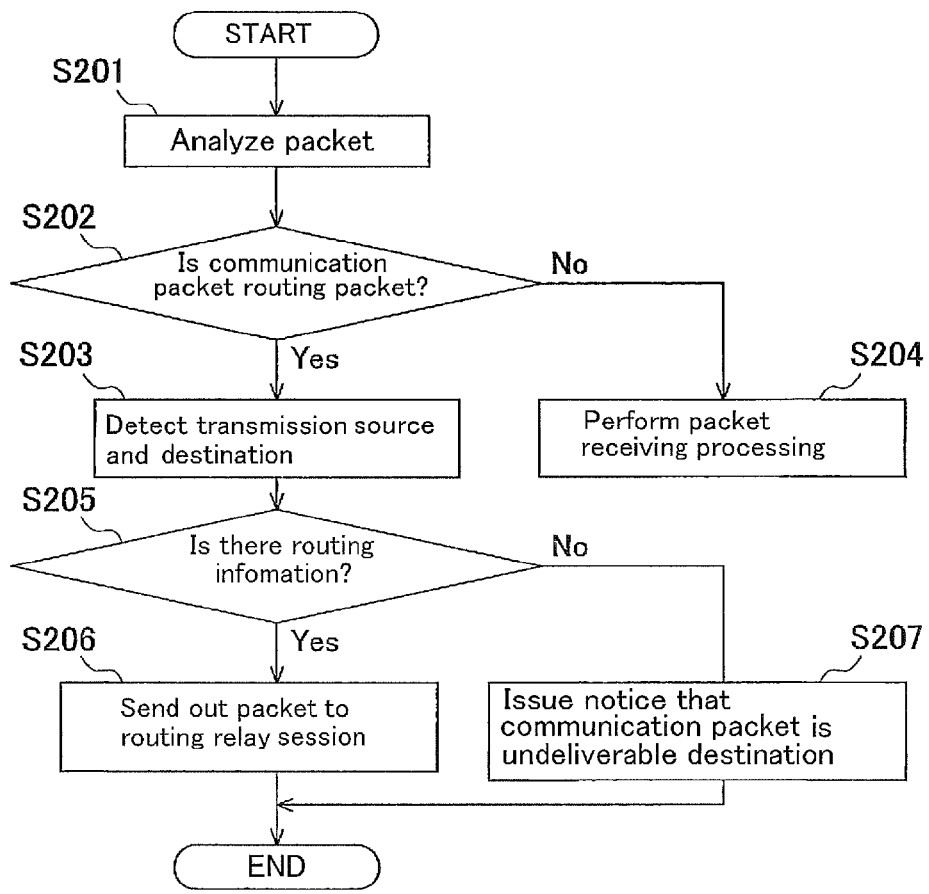
FIG. 26 is a flowchart showing routing process.

FIG. 26 is a flowchart in which the relay server actually performs the routing process for the communication packet when the routing session has been established. Upon receiving the communication packet, the relay server analyzes the communication packet (S201), and determines whether or not the communication packet is a routing packet (Step S202). If the communication packet is not a routing packet (NO in Step S202), the relay server performs reception process for the communication packet (Step S204).

If the communication packet is a routing packet (YES in Step S202), then the relay server detects a transmission source IP address and a destination IP address of the communication packet (Step S203). Then, based on the detected transmission source IP address and destination IP address, the relay server determines whether or not it is possible to route the communication packet. That is to say, the relay server determines whether or not the transmission source IP address and the destination IP address are registered in the information of the routing group to which the relay server belongs (Step S205).

If the relay server determines that it is possible to route the communication packet, then the relay server sends out the communication packet by using the established routing session (Step S206). If the relay server determines that it is not possible to route the communication packet, then the relay server notifies the terminal serving as the transmission source that it is impossible to deliver the communication packet to the destination (Step S207).

With reference to the block diagram of FIG. 2, a description is provided of a flow of the routing process. The first relay server A receives a communication packet through the interface 121 and the LAN driver 151. If the communication packet is received from the LAN side, the communication packet is outputted through the LAN-side packet processing unit 152 to the routing control unit 154. The routing control unit 154 refers to the routing group information, and confirms whether or not the routing information is present. In the case where the routing information is present, the communication packet is outputted to the inter-relay server connection processing unit 155.

Depending on the destination IP address of the communication packet, the inter-relay server connection processing unit 155 determines a connection through which the communication packet is to be relayed, and delivers the communication packet to the generated relay server X connection unit 156.

The relay server X connection unit 156 outputs the communication packet to the WAN-side IP packet processing unit 153. In such a way, the communication packet is transferred through the LAN driver 151 and the interface 121 to the relay server on the other end by using the routing session.

In the relay communication system of the present preferred embodiment, the routing group information is constructed such that it is possible to establish the routing session necessary for the routing and to route the communication packet among the communication terminals through the WAN 4. The process to construct the routing group information can be performed while the routing information is being displayed to the user, and good workability is achieved. Moreover, duplication of IP addresses can be detected based on the routing information.

The description has been provided above of preferred embodiments of the present invention. However, the present invention is not limited to the above-described preferred embodiments, and is modifiable in various ways within the scope without departing from the spirit of the present invention.

For example, in some cases, routing information may be updated at any of the routing points. Specifically, for example, the control unit of the client terminal may update the routing information. As a result, the updated routing information is shared among the relay servers and the client terminals. Subsequently, the routing group information is also updated, and the updated routing group information is shared among the relay servers and the client terminals.

Moreover, in the above-described preferred embodiments, an example has been described, where the routing session is preferably established through the WAN 4 among the terminals which function as the routing control points in the routing group. However, as long as the terminals belong to the same routing group, the routing session may also be established among the terminals, for example, which function as the routing control points in the same LAN.

Various preferred embodiments of the present invention can be widely applied to the relay communication system including a plurality of relay servers capable of communicating with one another, a plurality of client terminals, and LANs to connect the client terminals to the relay servers, and to the relay servers for use in the relay communication system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay server for communicating with a first relay server connected to a first network, and functioning as a second relay server connected to a second network, the relay server comprising:
 a relay group information sharing unit configured to share relay group information between the first relay server and the second relay server, the relay group information indicating that the first relay server and the second relay server constitute a relay group;
 a relay server information sharing unit configured to share relay server information between the first relay server and the second relay server, the relay server information including activation information of the first relay server, activation information of the second relay server, activation/registration information of a client terminal connected to the first relay server, and activation/registration information of a client terminal connected to the second relay server;
 a routing information sharing unit configured to share routing information between the first relay server and the second relay server, the routing information including routing control points and network addresses controlled by the routing control points, the routing control points including at least two of the first relay server in the relay group, the second relay server in the relay group, the client terminal connected to the first relay server, and the client terminal connected to the second relay server;
 a routing group information creation unit configured to edit the routing information to create routing group information by grouping the routing control points;
 a routing group information sharing unit configured to share the routing group information among the first relay server, the second relay server, the client terminal connected to the first relay server, and the client terminal connected to the second relay server;
 a routing session establishment unit configured to establish a routing session for each group indicated in the routing group information while referring to the relay server information, the routing session enabling a communication packet to be routed via the routing control points;
 a routing control unit configured, when receiving a communication packet which is a routing packet, to output the communication packet if a destination network address included in the received communication packet has been registered in the routing group information; and
 an inter-relay server connection processing unit configured to receive the outputted communication packet and to decide a connection through which the communication packet is to be relayed based on a destination network address included in the communication packet such that the communication packet can be forwarded through the established routing session.

2. The relay server according to claim 1, further comprising a routing function control unit configured to validate/invalidate a routing function for each group indicated in the routing group information.

3. The relay server according to claim 1, further comprising a display device configured to display the routing information.

4. The relay server according to claim 1, further comprising a routing information update unit configured to update the routing information.

5. A relay communication system, comprising;
 a first network;
 a second network;
 a first relay server connected to the first network; and
 a second relay server connected to the second network; wherein
 each of the first relay server and the second relay server includes:
  a relay server information sharing unit configured to share relay server information between the first relay server and the second relay server, the relay server information including activation information of the first relay server, activation information of the second relay server, activation/registration information of a client terminal connected to the first relay server, and activation/registration information of a client terminal connected to the second relay server;
  a routing information sharing unit configured to share routing information between the first relay server and the second relay server, the routing information including routing control points and network addresses controlled by the routing control points, the routing control points including at least two of the first relay server, the second relay server, the client terminal connected to the first relay server, and the client terminal connected to the second relay server;
  a routing group information sharing unit configured to share routing group information among the first relay server, the second relay server, the client terminal connected to the first relay server, and the client terminal connected to the second relay server, the routing group information being formed by grouping the routing control points;
  a routing session establishment unit configured to establish a routing session for each group indicated in the routing group information while referring to the relay server information, the routing session enabling a communication packet to be routed via the routing control points;
  a routing control unit configured, when receiving a communication packet which is a routing packet, to output the communication packet if a destination network address included in the received communication packet has been registered in the routing group information; and
  an inter-relay server connection processing unit configured to receive the outputted communication packet and to decide a connection through which the communication packet is to be relayed based on a destination network address included in the communication packet such that the communication packet can be forwarded through the established routing session.

6. The relay communication system according to claim 5, further comprising a routing function control unit configured to validate/invalidate a routing function for each group indicated in the routing group information.

7. The relay communication system according to claim 5, further comprising a display device configured to display the routing information.

8. The relay communication system according to claim 5, further comprising a routing information update unit configured to update the routing information.

* * * * *